US012572095B2

(12) United States Patent
Inoue et al.

(10) Patent No.: US 12,572,095 B2
(45) Date of Patent: Mar. 10, 2026

(54) IMAGE FORMING APPARATUS

(71) Applicants: Daisuke Inoue, Tokyo (JP); Takamasa Hase, Kanagawa (JP); Kentaro Yamashita, Kanagawa (JP); Arinobu Yoshiura, Kanagawa (JP); Shogo Nakamoto, Kanagawa (JP); Mototaka Iwama, Kanagawa (JP)

(72) Inventors: Daisuke Inoue, Tokyo (JP); Takamasa Hase, Kanagawa (JP); Kentaro Yamashita, Kanagawa (JP); Arinobu Yoshiura, Kanagawa (JP); Shogo Nakamoto, Kanagawa (JP); Mototaka Iwama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/637,488

(22) Filed: Apr. 17, 2024

(65) Prior Publication Data

US 2024/0353778 A1 Oct. 24, 2024

(30) Foreign Application Priority Data

Apr. 19, 2023 (JP) ................................ 2023-068508

(51) Int. Cl.

| | |
|---|---|
| ***G03G 15/20*** | (2006.01) |
| ***G03G 15/00*** | (2006.01) |
| ***G03G 15/01*** | (2006.01) |

(52) U.S. Cl.
CPC ..... *G03G 15/2017* (2013.01); *G03G 15/0105* (2013.01); *G03G 15/0189* (2013.01); *G03G 15/2064* (2013.01); *G03G 15/50* (2013.01)

(58) Field of Classification Search
CPC .......... G03G 15/2017; G03G 15/2039; G03G 15/2042; G03G 15/2046; G03G 15/2053; G03G 2215/2003
See application file for complete search history.

(56) References Cited

U.S. PATENT DOCUMENTS

2003/0235421 A1* 12/2003 Hooper .............. G03G 15/2039 399/69
2014/0079424 A1* 3/2014 Ikebuchi ............ G03G 15/2053 399/69

(Continued)

FOREIGN PATENT DOCUMENTS

JP 2014-240945 A 12/2014
JP 2020-181093 A 11/2020

*Primary Examiner* — Thomas S Giampaolo, II
(74) *Attorney, Agent, or Firm* — XSENSUS LLP

(57) ABSTRACT

An image forming apparatus includes an image forming section, a fixing device, and circuitry. The image forming section forms an image on a recording medium. The fixing device includes a rotator including a flexible endless belt, a pressure rotator pressed against the rotator to form a nip between the rotator and the pressure rotator, a heater heating the rotator, and a movable shield. The movable shield is disposed between the heater and the rotator to shield the rotator from radiant heat generated from the heater and is movable according to a size of the recording medium. The circuitry is configured to control the image forming section to form the image on the recording medium based on an image forming condition and change at least one of an operating temperature of the movable shield or a shielding amount of the movable shield based on the image forming condition.

16 Claims, 11 Drawing Sheets

(56) References Cited

U.S. PATENT DOCUMENTS

| | | | |
|---|---|---|---|
| 2014/0341623 A1 | 11/2014 | Arai et al. | |
| 2020/0033767 A1 | 1/2020 | Adachi et al. | |
| 2020/0033775 A1 | 1/2020 | Inoue et al. | |
| 2020/0241452 A1 | 7/2020 | Saitoh et al. | |
| 2020/0241453 A1 | 7/2020 | Okamoto et al. | |
| 2020/0249601 A1 | 8/2020 | Inoue et al. | |
| 2020/0249602 A1 | 8/2020 | Inoue et al. | |
| 2020/0292972 A1 | 9/2020 | Inoue et al. | |
| 2020/0292973 A1 | 9/2020 | Furuichi et al. | |
| 2020/0401067 A1 | 12/2020 | Samei et al. | |
| 2021/0157259 A1 | 5/2021 | Inoue et al. | |
| 2021/0318655 A1 | 10/2021 | Inoue et al. | |
| 2021/0397114 A1* | 12/2021 | Fukasawa ............ | G03G 15/205 |
| 2022/0299919 A1 | 9/2022 | Inoue et al. | |
| 2022/0299920 A1 | 9/2022 | Shimada et al. | |
| 2022/0308511 A1 | 9/2022 | Someya et al. | |
| 2022/0382192 A1 | 12/2022 | Inoue et al. | |
| 2023/0063779 A1 | 3/2023 | Shimada et al. | |
| 2023/0081075 A1 | 3/2023 | Someya et al. | |
| 2023/0093465 A1 | 3/2023 | Kabata et al. | |
| 2023/0297010 A1 | 9/2023 | Daisuke et al. | |
| 2023/0375967 A1 | 11/2023 | Nakamoto et al. | |

* cited by examiner

<PRESENT EMBODIMENT: SMALL IMAGE AREA RATE>

<COMPARATIVE EXAMPLE: SMALL IMAGE AREA RATE>

IMAGE FORMING APPARATUS

CROSS-REFERENCE TO RELATED APPLICATION

This patent application is based on and claims priority pursuant to 35 U.S.C. § 119 (a) to Japanese Patent Application No. 2023-068508, filed on Apr. 19, 2023, in the Japan Patent Office, the entire disclosure of which is hereby incorporated by reference herein.

BACKGROUND

Technical Field

Embodiments of the present disclosure relate to an image forming apparatus.

Related Art

Image forming apparatuses such as a copier, a printer, a facsimile machine, or a multifunctional machine having two or more of copying, printing, and facsimile functions, employ an electrophotographic process to form a toner image on a recording medium. The image forming apparatus includes a fixing device to fix the toner image onto the recording medium. As such as fixing device, a belt type fixing device is known in the art.

SUMMARY

This specification describes an improved image forming apparatus that includes an image forming section, a fixing device, and circuitry. The image forming section forms an image on a recording medium. The fixing device includes a rotator, a pressure rotator, a heater, and a movable shield. The rotator includes a flexible endless belt. The pressure rotator is pressed against the rotator to form a nip between the rotator and the pressure rotator. The heater heats the rotator. The movable shield is disposed between the heater and the rotator to shield the rotator from radiant heat generated from the heater and is movable according to a size of the recording medium. The circuitry is configured to control the image forming section to form the image on the recording medium based on an image forming condition and change at least one of an operating temperature of the movable shield or a shielding amount of the movable shield based on the image forming condition.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A-1 and 4B-1 are diagrams illustrating halogen heaters having different heat generation distributions;

FIGS. 4A-2 and 4B-2 are graphs of the heat generation distributions of the halogen heaters of FIGS. 4A-1 and 4B-2;

DETAILED DESCRIPTION

Figure 1:
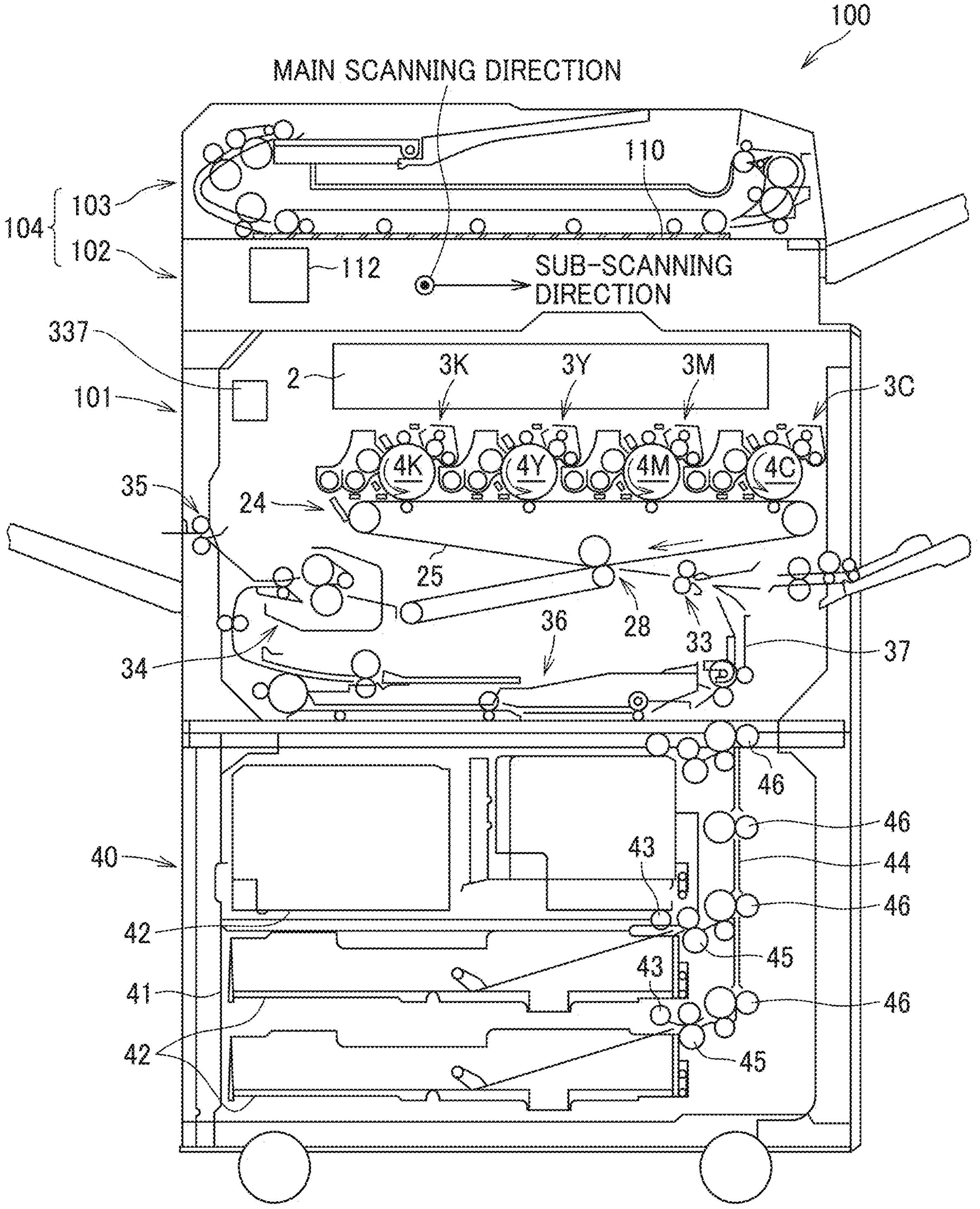
FIG. 1 is a schematic diagram illustrating a configuration of an image forming apparatus according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms “a,” “an,” and “the” are intended to include the plural forms as well, unless the context clearly indicates otherwise.

Embodiments of the present disclosure are described below in detail with reference to the drawings. Identical reference numerals are assigned to identical or equivalent components and a description of those components may be simplified or omitted.

The following describes a configuration of an image forming apparatus.

As illustrated in FIG. 1, an image forming apparatus 100 includes an image forming section 101, a sheet feeding device 40, and an image reading section 104. The image reading section 104 includes a scanner 102 fixed on the image forming section 101 and an automatic document feeder (ADF) 103 supported by the scanner 102. The scanner 102 includes a document plate glass 110 and a carrier 112 including an imaging forming lens, and the carrier 112 moves in the sub-scanning direction under a document placed on the document plate glass 110 to read the document.

The sheet feeding device 40 includes a sheet bank 41, sheet feed rollers 43, and sheet separation roller pairs 45. The sheet bank 41 includes multiple sheet trays 42 (three sheet trays 42 in the present embodiment) disposed in a multistage manner. Each of the sheet feed rollers 43 picks up a sheet as a recording medium from the corresponding sheet tray 42. Each of the sheet separation roller pairs 45 separates the sheet from other sheets and feeds the sheet to a conveyance passage 44. The image forming apparatus 100 further includes multiple conveyance rollers 46 that convey a sheet to a sheet conveyance passage 37. Thus, the sheet feeding device 40 feeds the sheet in the sheet tray 42 to the sheet conveyance passage 37 in the image forming apparatus 100.

The image forming section 101 includes an optical writing device 2, four process units 3K, 3Y, 3M, and 3C, a transfer unit 24, a sheet conveying unit 28, a timing roller pair 33, a fixing device 34, a sheet ejection roller pair 35, a switch back device 36, the sheet conveyance passage 37. The four process units 3K, 3Y, 3M, and 3C form a black toner image, a yellow toner image, a magenta toner image, and a cyan toner image, respectively. The transfer unit 24 includes an intermediate transfer belt 25.

The optical writing device 2 drives a light source, such as a laser diode or a light emitting diode (LED), disposed inside the optical writing device 2, to emit laser light L to four photoconductors 4K, 4Y, 4M, and 4C in the process units 3K, 3Y, 3M, and 3C.

Emitting the laser light L forms electrostatic latent images on the surfaces of the photoconductors 4K, 4Y, 4M, and 4C each having a drum-shape, and the electrostatic latent images are developed into toner images by a predetermined developing process. Suffixes K, Y, M, and C denote colors black, yellow, magenta, and cyan, respectively. To simplify the description, these suffixes may be omitted unless necessary in the following description.

In the image forming apparatus 100 having the above-described configuration, the toner images formed on the surfaces of the respective photoconductors 4K, 4Y, 4M, and 4C are sequentially and primarily transferred and superimposed onto the intermediate transfer belt 25 rotating clockwise in FIG. 1.

The above-described primary transfer process forms a four color superimposed toner image on the intermediate transfer belt 25. The timing roller pair 33 conveys the sheet supplied from the sheet feeding device 40 to a secondary transfer nip formed between the sheet conveying unit 28 and the intermediate transfer belt 25 at a predetermined timing to secondarily transfer the color toner image from the intermediate transfer belt 25 to the sheet at once.

After passing through the secondary transfer nip, the sheet is separated from the intermediate transfer belt 25 and conveyed to the fixing device 34. The fixing device 34 fixes the full-color toner image to the sheet P by application of heat and pressure. Then, the sheet P is conveyed from the fixing device 34 to the sheet ejection roller pair 35 to be ejected to the outside of the image forming apparatus 100. In addition, the image forming apparatus 100 includes a controller 337 that is circuitry. The controller 337 controls the image forming section 101 and the image reading section 104 to form the color toner image on the sheet as the recording medium.

The following describes the fixing device 34.

Figure 2:
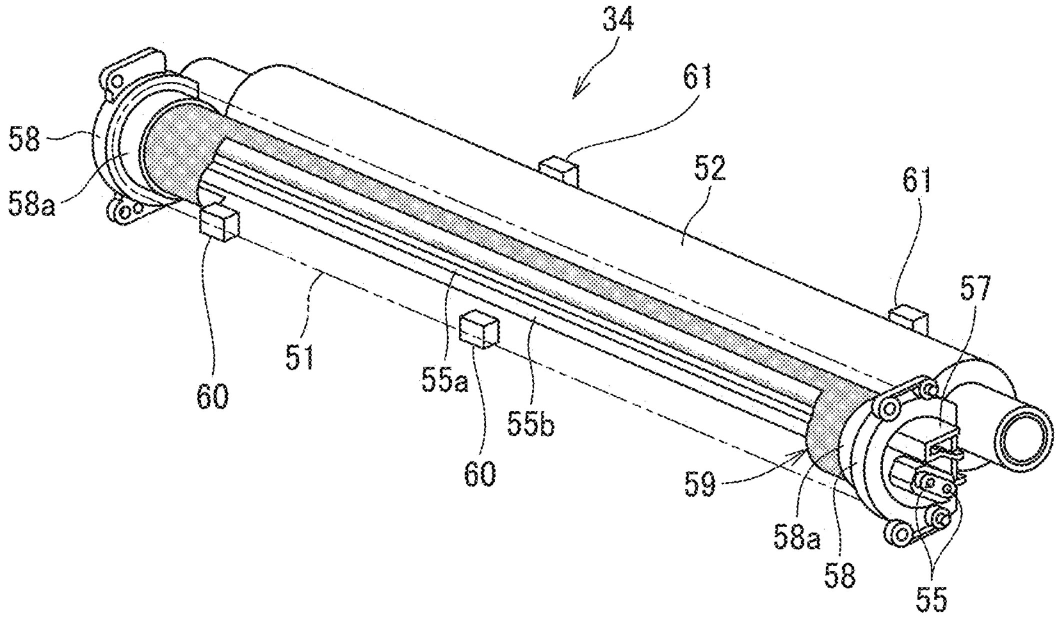
FIG. 2 is a schematic perspective view of a main part of a fixing device according to an embodiment of the present disclosure.

FIG. 2 is a schematic perspective view of a main part of the fixing device 34 according to the present embodiment. As illustrated in FIG. 2, flanges 58 as belt holders are inserted into both ends of a fixing belt 51, respectively. The flanges 58 rotatably hold the fixing belt 51.

Figure 3A:
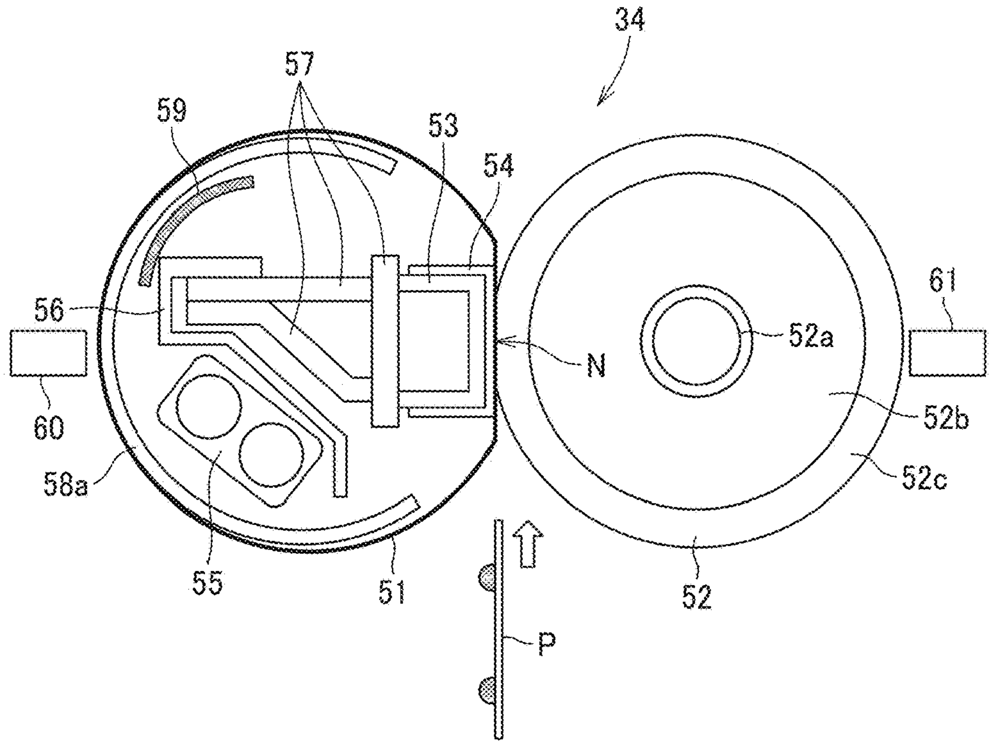
FIG. 3A is a schematic cross-sectional view of the main part of the fixing device of FIG. 2 to illustrate a movable shield at a retracted position.
Figure 3B:
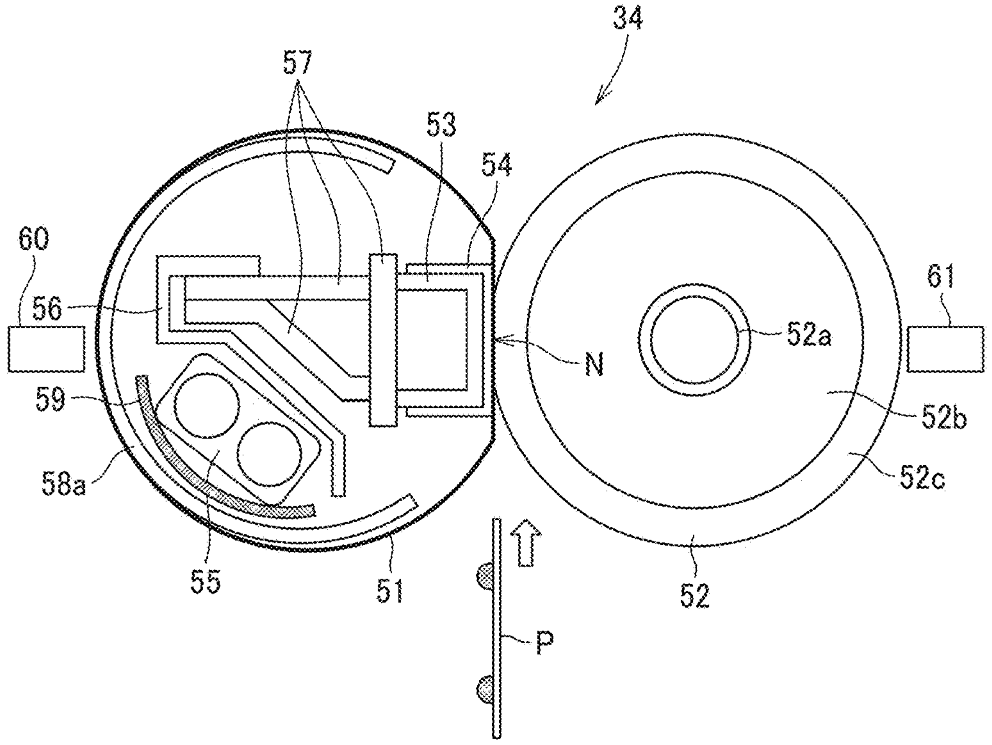
FIG. 3B is a schematic cross-sectional view of the main part of the fixing device of FIG. 2 to illustrate the movable shield of FIG. 3A at a shield position.

As illustrated in FIGS. 3A and 3B, both ends of the fixing belt 51 except parts around a fixing nip N are inserted into arc-shaped flange portions 58*a* of the flange 58. The arc-shaped flange portion 58*a* rotatably holds the fixing belt 51. The flange 58 or the arc-shaped flange portion 58*a* functions as a belt holder.

Two halogen heaters 55 (55*a* and 55*b*), a stay 57, and the flanges 58 are fixed to and supported by a pair of side plates of the fixing device 34. The two halogen heaters 55 (55*a* and 55*b*) are disposed inside the loop of the fixing belt 51 and upstream from the fixing nip N in a sheet conveyance direction in which the sheet is conveyed.

As illustrated in FIGS. 2, 3A, and 3B, the fixing device 34 includes a fixing belt 51 and a pressure roller 52 as an opposed rotator in contact with the outer circumferential surface of the fixing belt 51. In addition, the fixing device 34 includes halogen heaters 55 as a heat source to heat the fixing belt 51, and a base pad 53 as a nip formation pad contacting the inner circumferential surface of the fixing belt 51 on the pressure roller 52 to form the fixing nip N.

In addition, the fixing device 34 includes a stay 57 as a support to support the base pad 53 and a reflector 56 that reflects radiant heat from the halogen heaters 55 to the fixing belt 51. In addition, the fixing device 34 includes a movable shield 59 that shields the radiant heat from the halogen heaters 55 and temperature sensors 60 as temperature detectors that detect the temperatures of the fixing belt 51.

The fixing belt 51 is a thin, flexible, endless belt (which may be a film). Specifically, the fixing belt 51 includes a base layer forming the inner peripheral surface of the fixing belt 51. The base layer is made of metal such as nickel or steel use stainless (SUS) or resin such as polyimide (PI).

The fixing belt 51 includes a release layer made of tetrafluoroethylene-perfluoroalkylvinylether copolymer (PFA) or polytetrafluoroethylene (PTFE). The release layer is the outermost layer. An elastic layer made of rubber such as silicone rubber, silicone rubber foam, or fluoro rubber may be interposed between the base layer and the release layer.

The fixing belt 51 not including the elastic layer has a small thermal capacity that enhances a fixing property. However, as the pressure roller 52 and the fixing belt 51 sandwich and press the unfixed toner image T on the sheet P passing through the fixing nip N, slight surface asperities of the fixing belt 51 may be transferred onto the toner image T on the sheet P, resulting uneven gloss of the solid toner image T. To address this circumstance, preferably, the fixing belt 51 includes the elastic layer not thinner than 80 μm. The elastic layer not thinner than 80 μm elastically deforms to absorb the slight surface asperities in the fixing belt 51, thus preventing uneven gloss of the toner image on the sheet P.

In order to decrease the thermal capacity of the fixing belt 51, the fixing belt 51 in the present embodiment is thin and has a decreased loop diameter. For example, the base layer of the fixing belt 51 is designed to have a thickness of from 20 μm to 50 μm, the elastic layer is designed to have a thickness of from 80 μm to 300 μm, and the release layer is designed to have a thickness of from 3 μm to 50 μm. Thus, the fixing belt 51 is designed to have a total thickness not greater than 1 mm.

The loop diameter of the fixing belt 51 is set in a range of 20 mm to 40 mm. In order to further decrease the thermal capacity of the fixing belt 51, preferably, the fixing belt 51 may have a total thickness not greater than 0.20 mm and more preferably not greater than 0.16 mm. Preferably, the loop diameter of the fixing belt 51 may be 30 mm or less.

The pressure roller 52 includes a cored bar 52*a*, an elastic layer 52*b* disposed on the surface of the cored bar 52*a*, and a release layer 52*c* disposed on the surface of the elastic layer 52*b*. The elastic layer 52*b* is made of silicone rubber foam, silicon rubber, or fluoro rubber. The release layer 52*c* is made of PFA or PTFE. The pressurization assembly including a spring presses the pressure roller 52 against the fixing belt 51. Thus, the pressure roller 52 abuts on the nip formation pad via the fixing belt 51. At a portion at which the pressure roller 52 contacts and presses the fixing belt 51, deformation of the elastic layer 52*b* of the pressure roller 52 forms the fixing nip N having a predetermined width in the sheet conveyance direction.

In the present embodiment, the pressure roller 52 is a solid roller. Alternatively, the pressure roller 52 may be a hollow roller. In a case in which the pressure roller 52 is the hollow roller, a heat source such as the halogen heater may be disposed inside the pressure roller 52.

The elastic layer 52*b* of the pressure roller 52 may be made of solid rubber. Alternatively, if no heater is disposed inside the pressure roller 52, the elastic layer of the pressure roller 52 may be made of sponge rubber. The sponge rubber is preferable to the solid rubber because the sponge rubber has enhanced thermal insulation that draws less heat from the fixing belt 51.

A driver such as a motor disposed inside the image forming apparatus 100 drives and rotates the pressure roller 52. As the driver drives and rotates the pressure roller 52, a driving force of the driver is transmitted from the pressure roller 52 to the fixing belt 51 at the fixing nip N, thus rotating the fixing belt 51 in accordance with rotation of the pressure roller 52 by friction between the fixing belt 51 and the pressure roller 52.

A power source disposed inside the image forming apparatus 100 supplies power to the halogen heaters 55 so that the halogen heaters 55 generate heat. The controller 337 controls output of the power source based on the temperature of the outer peripheral surface of the fixing belt 51 detected by the temperature sensor 60.

Such heating control of the halogen heaters 55 adjusts the temperature of the fixing belt 51 to a desired fixing temperature. Instead of the temperature sensors 60 that detect the temperatures of the fixing belt 51, temperature sensors 61 that detect the temperatures of the pressure roller 52 may be disposed, and the controller 337 may predict the temperature of the fixing belt 51 based on the temperatures of the pressure roller 52 detected by the temperature sensors 61.

In the present embodiment, two halogen heaters 55 (55*a* and 55*b*) are disposed in the loop of the fixing belt 51, but one halogen heater 55 or three or more halogen heaters 55 may be disposed in the loop of the fixing belt 51 based on the size of the sheet P used in the image forming apparatus 100. However, when the cost of the halogen heater 55 itself and a space inside the loop of the fixing belt 51 are considered, a desirable number of the halogen heaters 55 is two or less. The radiant heat radiated from the heat source heats the fixing belt 51. The heat source may be a resistive heat generator or carbon heater instead of the halogen heater.

The nip formation pad includes a base pad 53 and a sliding sheet 54 disposed on the surface of the base pad 53, the surface facing the fixing belt 51. The sliding sheet 54 has a low coefficient of friction. The base pad 53 extends in the axial direction of the fixing belt 51 or the axial direction of the pressure roller 52.

The base pad 53 receives a pressing force from the pressure roller 52 and determines a shape of the fixing nip N. In the present embodiment, the shape of the fixing nip Nis a flat shape but may be a concave shape or another shape.

The sliding sheet 54 is disposed to reduce sliding friction when the fixing belt 51 rotates. The base pad 53 itself made of a low-friction member enables a configuration not including the sliding sheet 54.

The base pad 53 is made of a heat-resistant material having a heat-resistant temperature of 200° C. or more to prevent deformation of the nip formation pad due to heat in the toner fixing temperature range, thereby ensuring a stable state of the fixing nip N and stabilizing qualities in the image on the ejected sheet P. The material of the base pad 53 may be typical heat-resistant resin such as polyethersulfone (PES), polyphenylene sulfide (PPS), liquid crystal polymer (LCP), polyethernitrile (PEN), polyamide-imide (PAI), and polyetheretherketone (PEEK).

The stay 57 supports and fixes the base pad 53. The stay 57 prevents the nip formation pad from being bent by the pressure from the pressure roller 52 to form the fixing nip having a uniform width along the axial direction of the pressure roller 52.

Preferably, the stay 57 is made of metal having an increased mechanical strength, such as stainless steel or iron, to prevent bending of the nip formation pad. The base pad 53 is preferably made of a rigid material to enhance the strength of the base pad 53. The material of the base pad 53 may be resin such as liquid crystal polymer (LCP), metal, or ceramic.

The reflector 56 is fixed to and supported by the stay 57 so as to face the halogen heaters 55. The reflector 56 reflects the radiant heat and light emitted from the halogen heaters 55 toward the fixing belt 51 to prevent the heat from being transmitted to the stay 57. As a result, the fixing belt 51 is efficiently heated, and energy is saved.

The material of the reflector 56 may be aluminum or stainless steel. In particular, the reflector made of an aluminum base on which silver having low emissivity (in other words, high reflectivity) is evaporated enhances the heating efficiency of the fixing belt 51.

A face of the reflector 56 facing the halogen heater 55 is formed to spread over the inner peripheral surface of the fixing belt 51. As illustrated in FIGS. 3A and 3B, the reflector 56 has a portion facing a lower portion of the halogen heater 55 and extending in a circumferential direction of the fixing belt 51 to shield the fixing belt 51 from radiant heat radiated from both ends of the halogen heaters 55. The above-described portion of the reflector 56 does not extend over the entire length of the reflector 56 in the longitudinal direction of the reflector 56.

The movable shield 59 is described below. The sheet passing through the fixing nip N takes heat from the fixing belt 51. However, the fixing belt 51 has a non-sheet-passing region where the sheet does not contact the fixing belt 51. In the non-sheet-passing region, the heat is not taken from the fixing belt 51 because the sheet does not contact the fixing belt 51. As a result, the heat source may excessively heat the non-sheet-passing region of the fixing belt 51, and the temperature in the non-sheet-passing region may excessively rise, which is called as an "excessive temperature rise in an end of the fixing belt." The excessive temperature rise in the end of the fixing belt may cause damage to the fixing belt 51 or the pressure roller 52. Reducing a print speed can reduce the excessive temperature rise in the end of the fixing belt but has a disadvantage that the productivity is reduced.

To countermeasure the excessive temperature rise in the end of the fixing belt, the fixing device according to the present embodiment includes the movable shield 59 that shields the heat of the heater radiated to the non-sheet-passing region of the fixing belt 51. In response to a temperature in the non-sheet-passing region reaching a predetermined temperature, the movable shield moves to a shield position to shield the fixing belt 51 from the heat of the heater to prevent the occurrence of the excessive temperature rise in the end of the fixing belt. Moving the movable shield 59 to the shield position prevents the excessive temperature rise in the end of the fixing belt and enables performing good fixing without lowering the productivity.

The movable shield 59 is made of a metal plate such as a SUS plate having heat resistance and a thickness of 0.1 mm to 1.0 mm so as to have a cross-sectional shape along the inner peripheral surface of the fixing belt 51. In FIGS. 3A and 3B, the cross-sectional shape of the movable shield 59 has ends and is not a ring closed in the circumferential direction. Specifically, the cross-sectional shape of the movable shield 59 is an arc.

The movable shield 59 is rotatable around the halogen heaters 55. In the present embodiment, the movable shield 59 is rotatable in the circumferential direction of the fixing belt 51. Specifically, a circumferential region of the fixing belt 51 has a directly heated region directly facing the halogen heaters 55 and heated by the halogen heaters 55. In addition, the circumferential region of the fixing belt 51 has a non-directly heated region in which a member other than the movable shield 59, such as the reflector 56, the stay 57, or the nip formation pad exists between the halogen heater 55 and the fixing belt 51.

When the movable shield 59 does not thermally shield between the halogen heater 55 and the fixing belt 51, the movable shield 59 is moved to a retracted position facing the non-directly heated region as illustrated in FIG. 3A. In other words, the movable shield 59 is retracted to a space facing the reflector 56 or the stay 57 and not facing the halogen heaters 55.

When the movable shield 59 thermally shields between the halogen heater 55 and the fixing belt 51, the movable shield 59 is disposed at a shielding position facing the directly heated region as illustrated in FIG. 3B. The movable shield 59 is preferably made of ceramic or metal such as aluminum, iron, or SUS because the movable shield 59 requires heat resistance.

Figure 8:
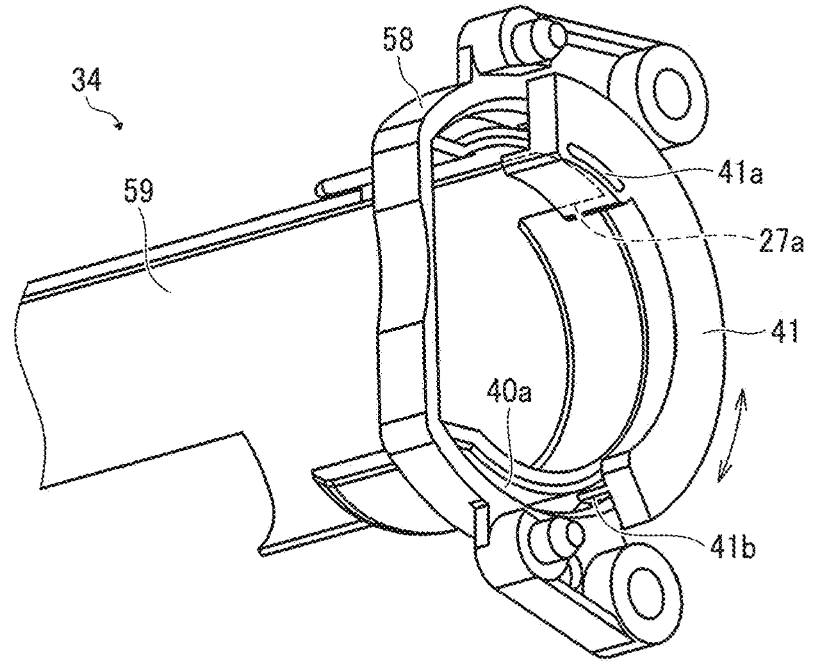
FIG. 8 is a partial perspective view of the fixing device in FIG. 2 to illustrate a supporting structure to support the movable shield.

FIG. 8 is a partial perspective view of the fixing device 34 to illustrate a supporting structure to support the movable shield 59. As illustrated in FIG. 8, the movable shield 59 is supported by an arcuate slider 41 rotatably or slidably attached to the flange 58. For example, a projection 27*a* disposed at each lateral end of the movable shield 59 in the axial direction of the fixing belt 51 is inserted into a hole 41*a* produced in a slider 41. Thus, the movable shield 59 is attached to the slider 41. The slider 41 includes a tab 41*b* projecting inboard in the axial direction of the fixing belt 51 toward the movable shield 59. As the tab 41*b* of the slider 41 is inserted into an arcuate groove 40*a* produced in the flange 58, the slider 41 is slidably movable in the groove 40*a*. Accordingly, the movable shield 59, together with the slider 41, is rotatable or movable in a circumferential direction of the flange 58. The flange 58 and the slider 41 are made of resin.

Although FIG. 8 illustrates the support structure that supports the movable shield 59 at one lateral end thereof in the axial direction of the fixing belt 51, another lateral end of the movable shield 59 in the axial direction of the fixing belt 51 is also supported by the support structure illustrated in FIG. 6. Thus, another lateral end of the movable shield 59 is also rotatably or movably supported by the slider 41 slidable in the groove 40*a* of the flange 58.

Figure 9:
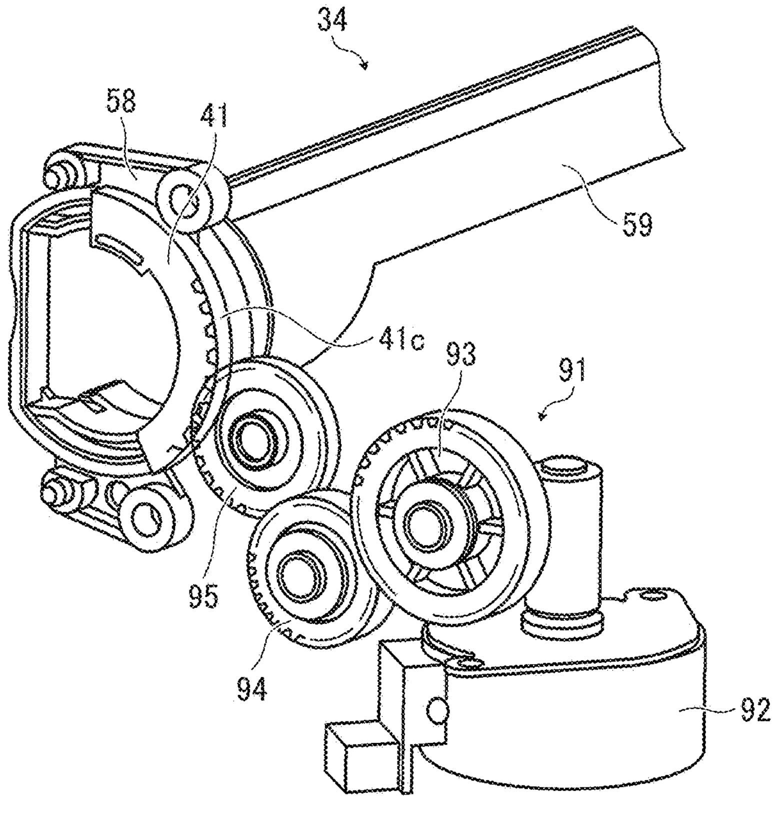
FIG. 9 is a partial perspective view of the fixing device in FIG. 2 to illustrate a driver driving the movable shield.

FIG. 9 is a partial perspective view of the fixing device 34 to illustrate a driver 91 driving the movable shield 59. As illustrated in FIG. 9, the driver 91 includes a motor 92 serving as a driving source and multiple gears 93, 94, and 95 constituting a gear train. The gear 93 serving as one end of the gear train is connected to the motor 92. The gear 95 serving as another end of the gear train is connected to a gear 41*c* produced on the slider 41 along a circumferential direction thereof. Accordingly, as the motor 92 is driven, a driving force is transmitted from the motor 92 to the gear 41*c* of the slider 41 through the gear train, that is, the gears 93 to 95, thus rotating the movable shield 59 supported by the slider 41.

Figure 10:
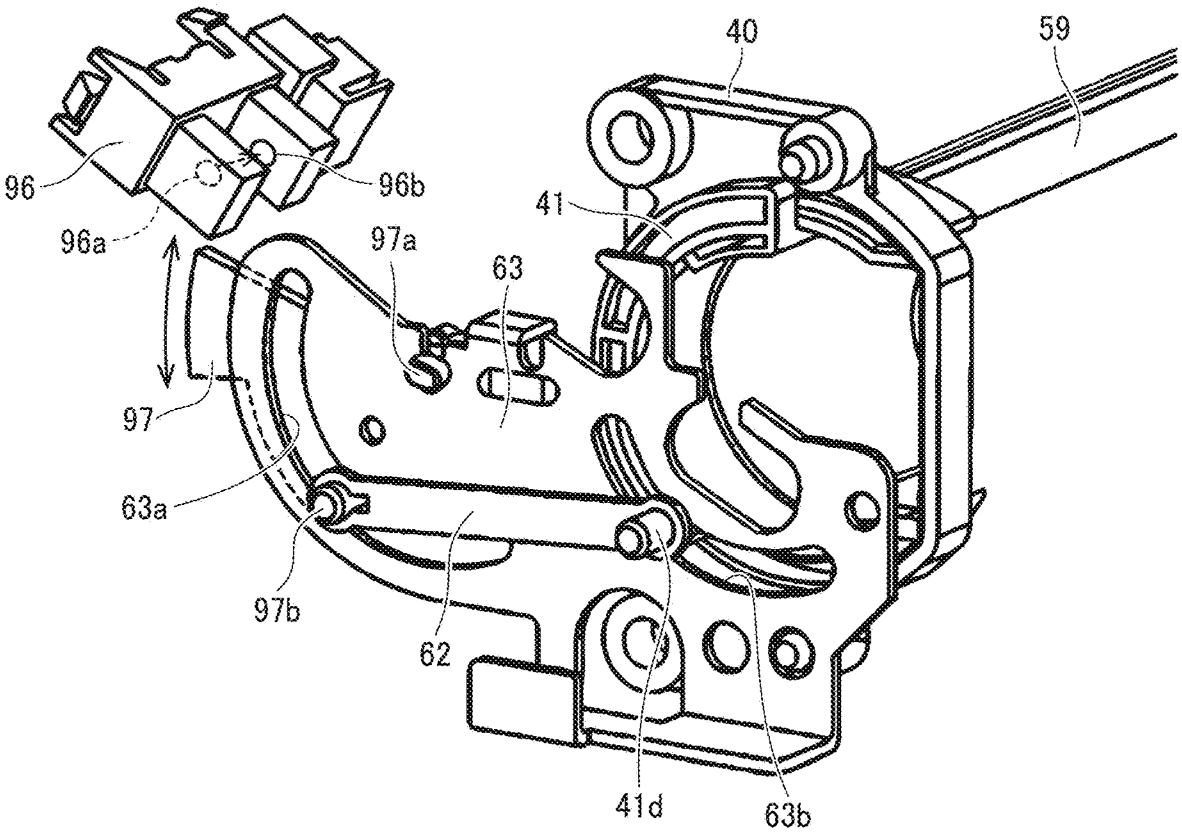
FIG. 10 is a partial perspective view of the fixing device in FIG. 2 to illustrate a structure to detect a position of the movable shield.

The fixing device 34 in the present embodiment includes a position detector to detect a position of the movable shield (in other words, a shielding amount of the movable shield) as illustrated in FIG. 10.

The position detector includes a transmissive photo-interrupter 96 as a position sensor. The photo-interrupter 96 includes a light-emitting unit 96*a* including a light-emitting diode and a light receiving unit 96*b* including a photosensor. The light-emitting unit 96*a* and the light receiving unit 96*b* are arranged opposite to each other such that the light-emitting unit 96*a* emits light toward the light receiving unit 96*b*, and the light receiving unit 96*b* outputs a detection signal corresponding to the received intensity of the incident light. The photo-interrupter 96 detects the position of the movable shield 59 via a feeler 97 serving as a detected member that is displaced in accordance with the position of the movable shield 59. The feeler 97 is supported by a support 63 and is rotatable about a supporting point 97*a*. The feeler 97 is connected to the movable shield 59 via a link 62 in an interlocking manner. One end portion of the link 62 is connected to a protrusion 97*b* provided on the feeler 97, and the other end portion is connected to a protrusion 41*d* provided on the slider 41. The protrusion 97*b* of the feeler 97 and the protrusion 41*d* of the slider 41 are movable along arc-shaped slits 63*a* and 63*b* serving as guides provided on the support 63. In the position detector as described above, moving the slider 41 along the flange 58 to move the movable shield 59 rotates the feeler 97 about the supporting point 97*a*.

If the feeler 97 is interposed between the light-emitting unit 96*a* and the light receiving unit 96*b* of the photo-interrupter 96, the feeler 97 blocks light from the light-emitting unit 96*a*, so that a detection signal of the light receiving unit 96*b* is reduced. In contrast, if the feeler 97 is removed from between the light-emitting unit 96*a* and the light receiving unit 96*b*, light from the light-emitting unit 96*a* is incident on the light receiving unit 96*b*, so that a detection signal of the light receiving unit 96*b* is increased.

The controller 337 can detect the arrival of the movable shield 59 at a predetermined position based on the magnitude of the detection signal of the light receiving unit 96*b*. As a result, the controller 337 obtains accurate position data of the movable shield 59. Based on the position data, the controller 337 can control the shielding amount of the movable shield 59.

The shielding amount of the movable shield 59 means a proportion of how much the movable shield 59 covers the halogen heaters 55. As illustrated in FIG. 3B, when the movable shield 59 entirely covers the halogen heaters 55, the shielding amount of the movable shield 59 is 100%. As illustrated in FIG. 3A, when the movable shield 51 is not between the halogen heaters 55 and the fixing belt 51, the shielding amount of the movable shield 59 is 0%.

Figure 11:
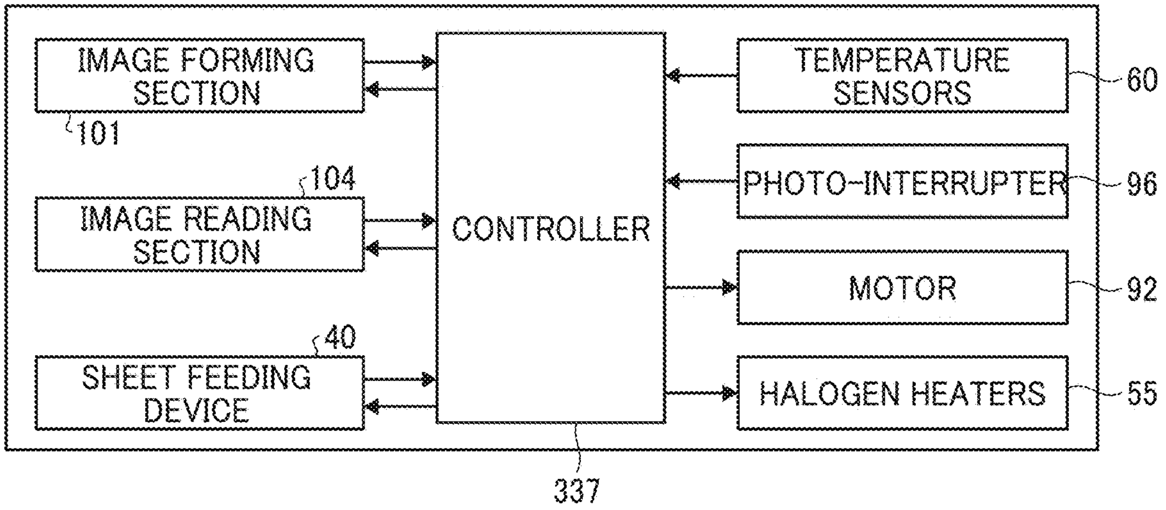
FIG. 11 is a block diagram of a controller and parts that relate to driving the movable shield.

FIG. 11 is a block diagram of the controller 337 and parts relating to the drive control of the movable shield 59. The controller 337 is circuitry including a central processing unit (CPU), a random-access memory (RAM), and a read-only memory (ROM). The ROM stores various data and programs to control the image forming apparatus 100 including a program to control the movable shield 59. The RAM temporarily stores various data including image data such as an image area rate, a toner overlapping ratio, a size of a margin, and the number of colors, and detection data of the photo-interrupter 96 and the temperature sensor 60. The controller 337 executes various control programs using the above-described data.

The halogen heater is described below.

Figures 1, 4A:
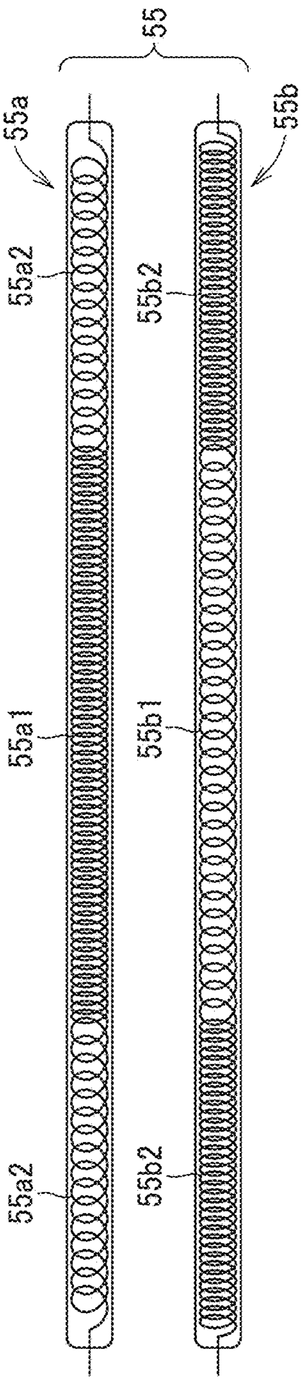
Figures 2, 4A:
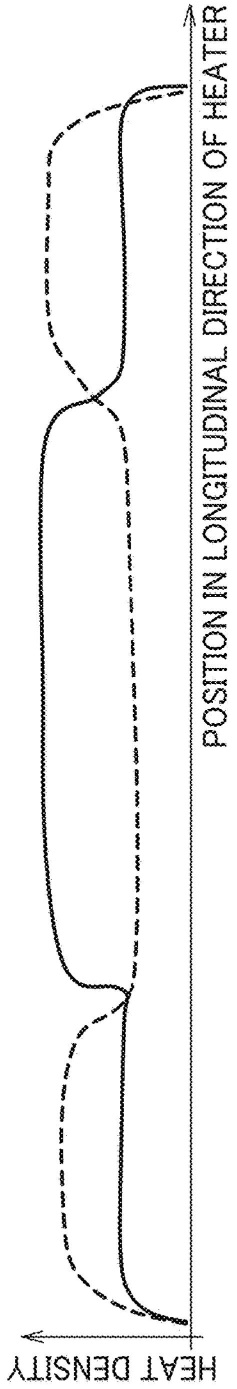
Figures 1, 4B:
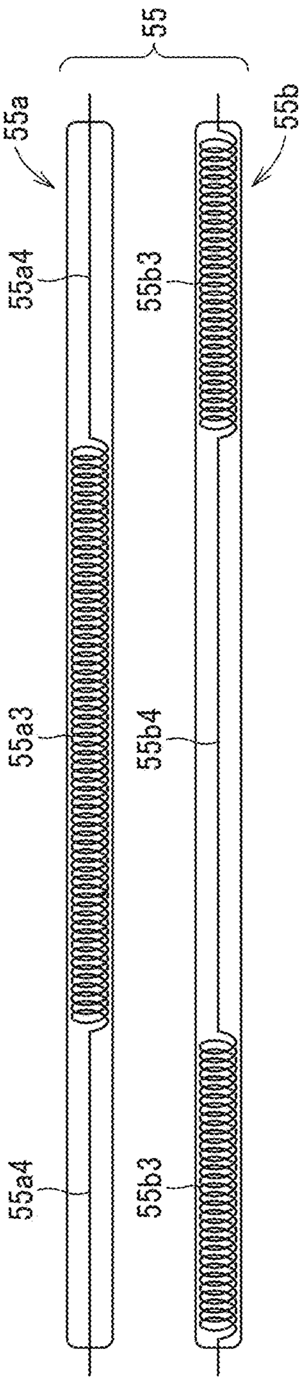
Figures 2, 4B:
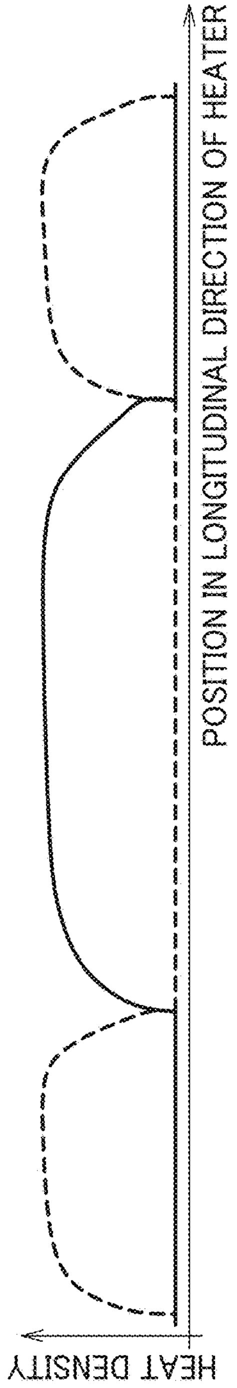

The halogen heaters 55 used in the fixing device 34 may be configured as illustrated in FIG. 4A-1 or 4B-1, for example. In both FIGS. 4A-1 and 4B-1, the halogen heaters 55 are two heaters, i.e., a heater 55*a* and a heater 55*b*.

The heaters 55*a* and 55*b* include central heaters 55*a*1, 55*b*1, 55*a*3, and 55*b*4 and end heaters 55*a*2, 55*b*2, 55*a*4, and 55*b*3. As described above, the halogen heater 55 has different heat generation regions disposed at a central portion of the halogen heater 55 and end portions of the halogen heater 55 in the longitudinal direction of the halogen heater 55.

As illustrated by the solid line in the graph of FIG. 4A-2, in one heater 55*a* in FIG. 4A-1, the heat density of the central heater 55*a* having a densely wound coil is larger than the heat density of the end heater 55*a*2 having a loosely wound coil. The heat density means a heat generation amount per unit length. As illustrated by the dashed line in the graph of FIG. 4A-2, in the other heater 55*b* in FIG. 4A-1, the heat density of the central heater 55*b*1 having a loosely wound coil is smaller than the heat density of the end heater 55*b*2 having a densely wound coil.

The end heater 55*a*4 of one heater 55*a* in FIG. 4B-1 has a straight line shape and generates almost no heat. The central heater 55*b*4 of the other heater 55*b* in FIG. 4B-1 has the straight line shape and generates almost no heat. As a result, as illustrated by the solid line in a graph of FIG. 4B-2, the central heater 55*a*3 having a densely wound coil in the one heater 55*a* in FIG. 4B-1 has a large heat density, and the heat density of the end heater 55*a*4 is almost zero. As illustrated by the dashed line in a graph of FIG. 4B-2, in the other heater 55*b* of FIG. 4B-1, the heat density of the central heater 55*b*4 is almost zero, and the end heater 55*b*3 having a densely wound coil has a large heat density.

In the halogen heaters 55 in FIG. 4B-1, the end heater 55*b*3 of the other heater 55*b* determines the amount of heat generation relating to the temperature rise in the non-sheet passing region and an abnormal image in the end of the sheet. For this reason, changing an operating temperature to move the movable shield based on an image corresponding to the position of a temperature sensor to control the end heater 55*b*3 enables more accurately satisfying both of preventing the temperature rise in the non-sheet-passing region and preventing the occurrence of the abnormal image in the end of the sheet. The operating temperature is a temperature at which the movable shield is moved.

FIG. 11 is a flowchart of control to change the operating temperature of the movable shield according to an embodiment of the present disclosure. The controller 337 controls the image forming section 101, the sheet feeder 40, and the image reading section 104 to start an image forming operation. The controller 337 obtains image data such as the image area rate, the toner overlapping ratio, the size of the margin, and the number of colors as image forming conditions from the image reading device 102 of the image reading section 104 in step S1. The ROM in the controller 337 stores a table of the relationship between the image forming condition and the operating temperature of the movable shield, which is experimentally determined. The central processing unit (CPU) in the controller 337 determines the operating temperature corresponding to the image forming condition based on the table in step S2.

The controller 337 receives temperature data from the temperature sensor 60 that detects the temperature in the end of the fixing belt 51 at a predetermined interval during printing in step S3. The predetermined interval is determined based on the performance of the CPU and the control content. The controller 337 determines whether the temperature in the end of the fixing belt 51 is equal to or higher than the determined operating temperature in step S4. In response to the temperature in the end of the fixing belt 51 reaching the operating temperature or higher, the controller 337 moves the movable shield to shield the end of the fixing belt from the radiant heat from the end heater 55*b*2 or 55*b*3 in step S5.

The controller 337 executes the above-described control until the print job is finished (YES in step S6). When the print job is not finished (NO in step S6), the controller 337 obtains the image forming condition to form a next image in step S1 and executes the above-described control. Since the excessive temperature rise in the end of the fixing belt does not occur after the print job is finished, the controller 337 controls the motor 92 to move the movable shield 59 to the retracted position illustrated in FIG. 3A.

In the control illustrated in FIG. 11, the controller 337 determines the operating temperature of the movable shield according to the image forming condition. Instead of the operating temperature of the movable shield, the controller 337 may change the shielding amount of the movable shield. In this case, the operating temperature is a constant value. The shielding amount of the movable shield under the constant operating temperature can be experimentally determined.

Figure 12:
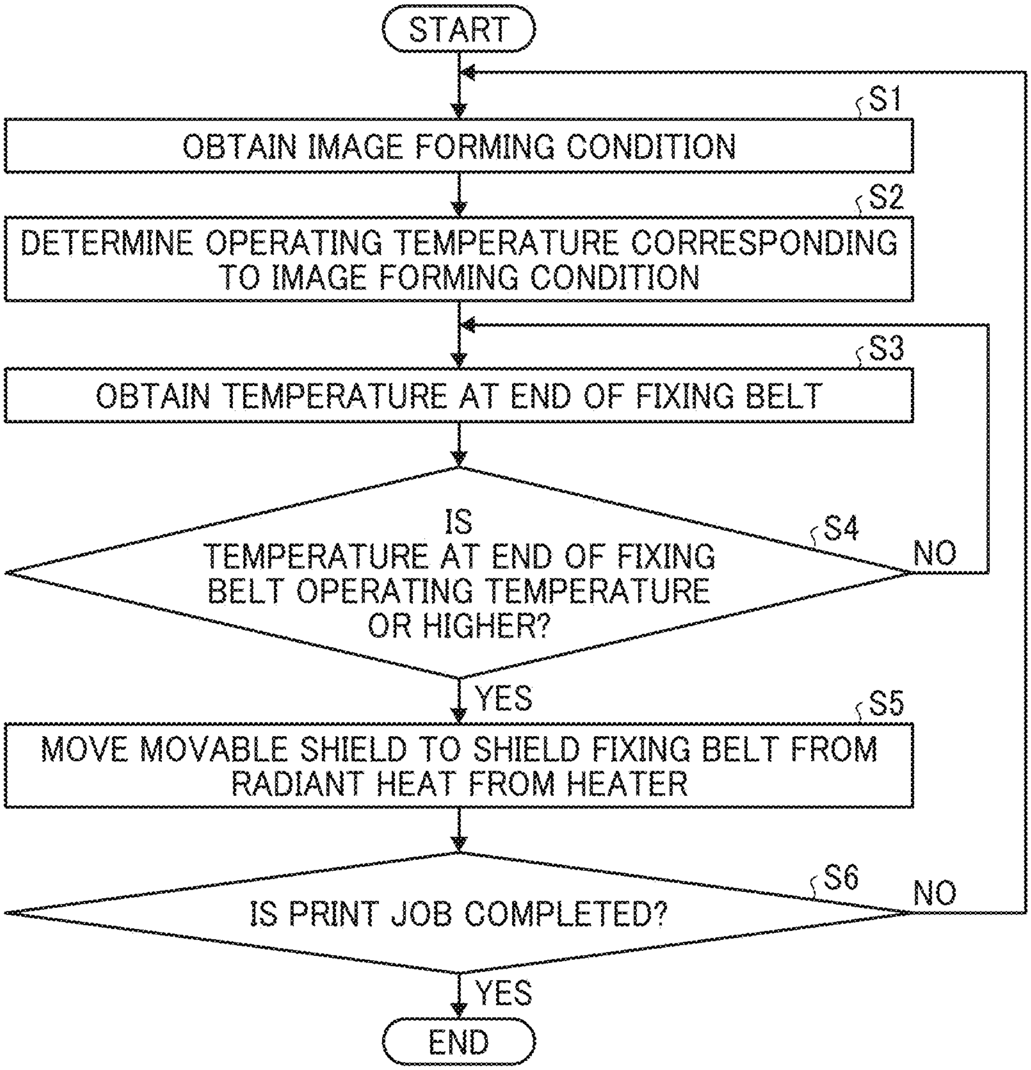
FIG. 12 is a flowchart of control to change an operating temperature of the movable shield according to an embodiment of the present disclosure.
Figure 13:
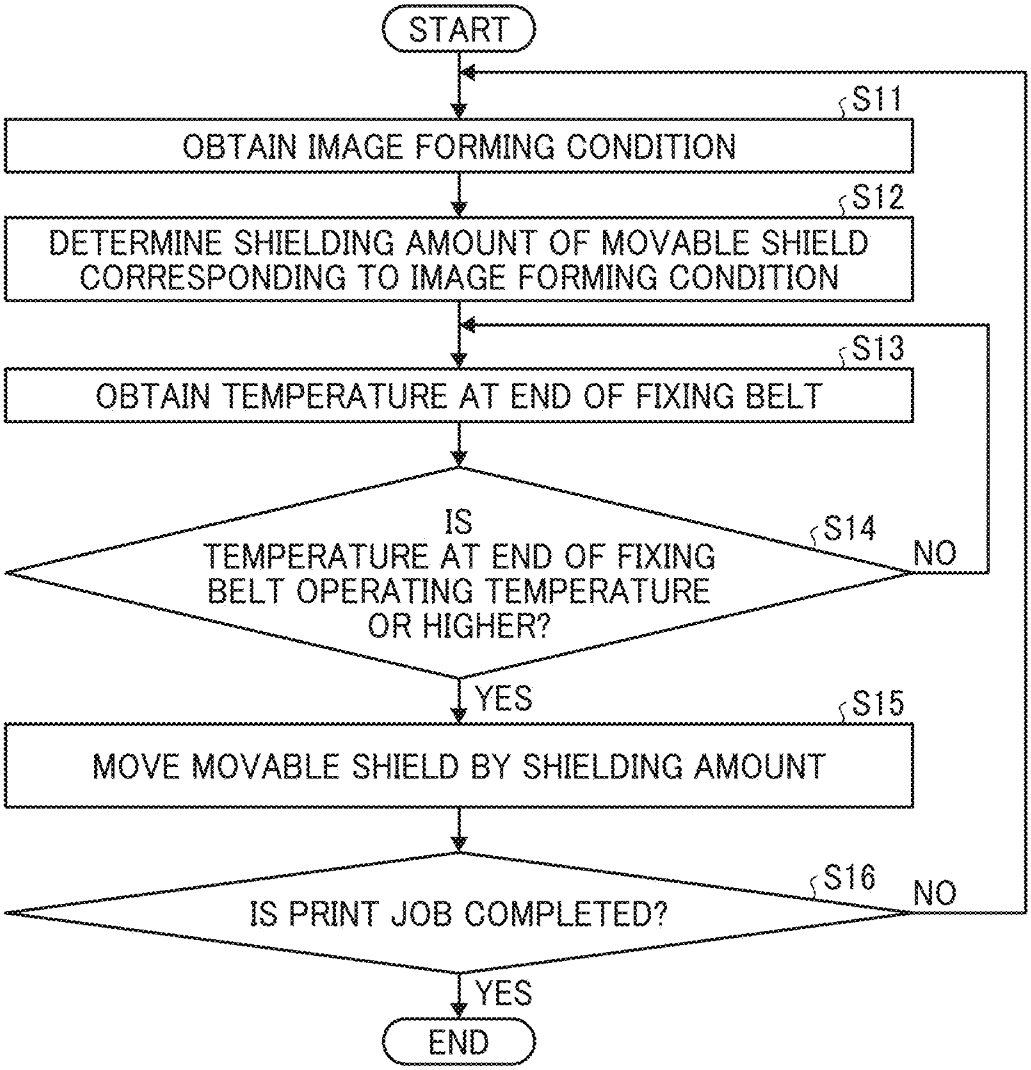
FIG. 13 is a flowchart of control to change an amount of shielding by the movable shield according to an embodiment of the present disclosure. The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 12 is a flowchart of control to change the shielding amount of the movable shield according to another embodiment of the present disclosure.

The controller 337 controls the image forming section 101, the sheet feeder 40, and the image reading section 104 to start an image forming operation. The controller 337 obtains image data such as the image area rate, the toner overlapping ratio, the size of the margin, and the number of colors as image forming conditions from the image reading device 102 of the image reading section 104 in step S11. The ROM in the controller 337 stores a table of the relationship between the image forming condition and the shielding amount of the movable shield, which is experimentally determined.

The CPU in the controller 337 determines the shielding amount corresponding to the image forming condition based on the table in step S12. The controller 337 receives temperature data from the temperature sensor 60 that detects the temperature in the end of the fixing belt 51 at a predetermined interval during printing in step S13. The predetermined interval is determined based on the performance of the CPU and the control content. The controller 337 determines whether the temperature in the end of the fixing belt 51 is equal to or higher than the constant operating temperature in step S14.

In response to the temperature in the end of the fixing belt 51 reaching the operating temperature or higher, the controller 337 moves the movable shield by the shielding amount corresponding to the image forming condition based on the detection signal of the photo-interrupter 96 to shield the end of the fixing belt from the radiant heat from the end heater 55*b*2 or 55*b*3 in step S15.

The controller 337 executes the above-described control until the print job is finished (YES in step S16). When the print job is not finished (NO in step S16), the controller 337 obtains the image forming condition to form a next image in step S11 and executes the above-described control. Since the excessive temperature rise in the end of the fixing belt does not occur after the print job is finished, the controller 337 controls the motor 92 to move the movable shield 59 to the retracted position illustrated in FIG. 3A.

Temperature change in the fixing belt 51 is described below.

When an image area rate is large, or when multiple color toners are overlaid (in other words, a toner overlapping ratio is large), a lot of toner is on the sheet. As a result, the amount of heat generated by the heater (duty) increases. In contrast, when the image area rate is small or when the toner overlapping ratio is small, the heat generation amount (duty) of the heater decreases.

Under the condition that the heater generates a large amount of heat, moving the movable shield 59 at a relatively low temperature prevents the excessive temperature rise in the end of the fixing belt. However, moving the movable shield 59 at the relatively low temperature under the condition that the heater generates a small amount of heat is likely to cause temperature drop in the end of the fixing belt. As a result, an abnormal image may occur in the end of the sheet.

To prevent the temperature drop in the end of the fixing belt, moving the movable shield 59 at a temperature higher than the relatively low temperature is likely to cause the excessive temperature rise in the end of the fixing belt under the condition that the heater generates the large amount of heat.

Figure 5A:
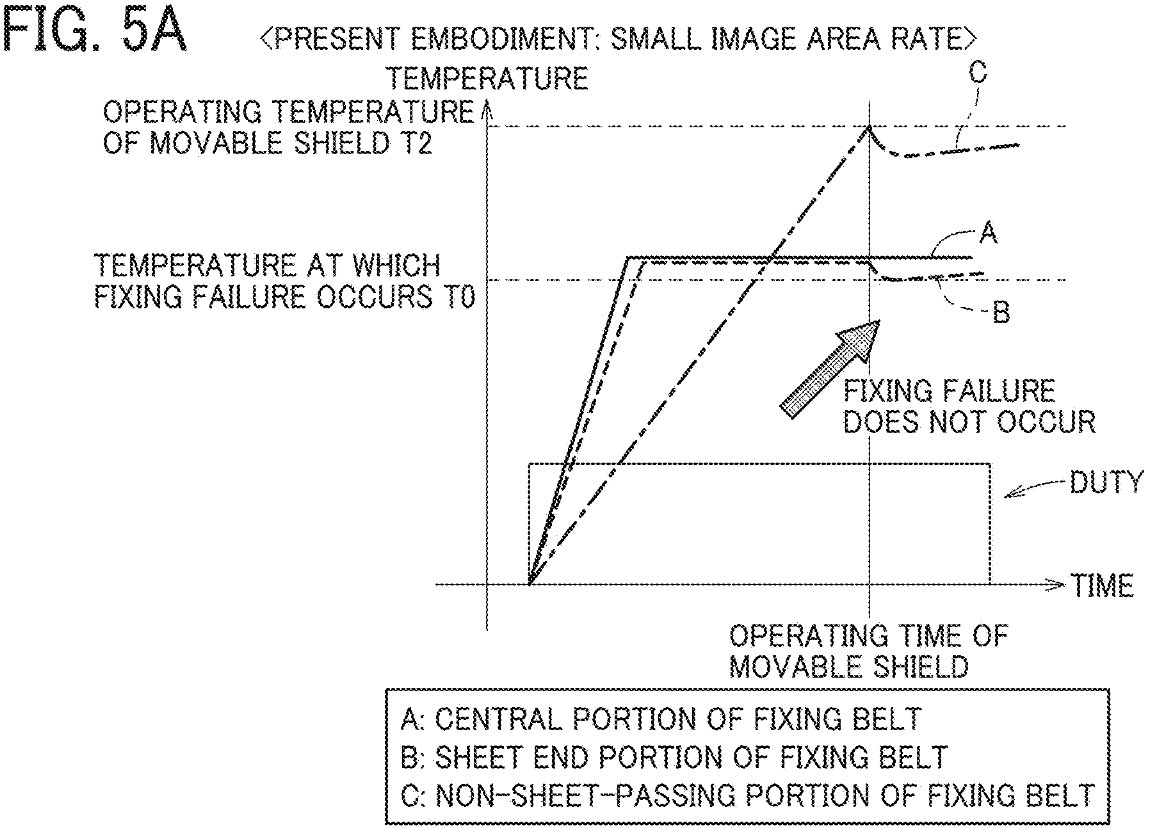
FIG. 5A is a graph illustrating temperatures of a fixing belt when the image forming apparatus prints images having small image area rates and when an operating temperature of the movable shield of FIG. 2 is high.
Figure 5B:
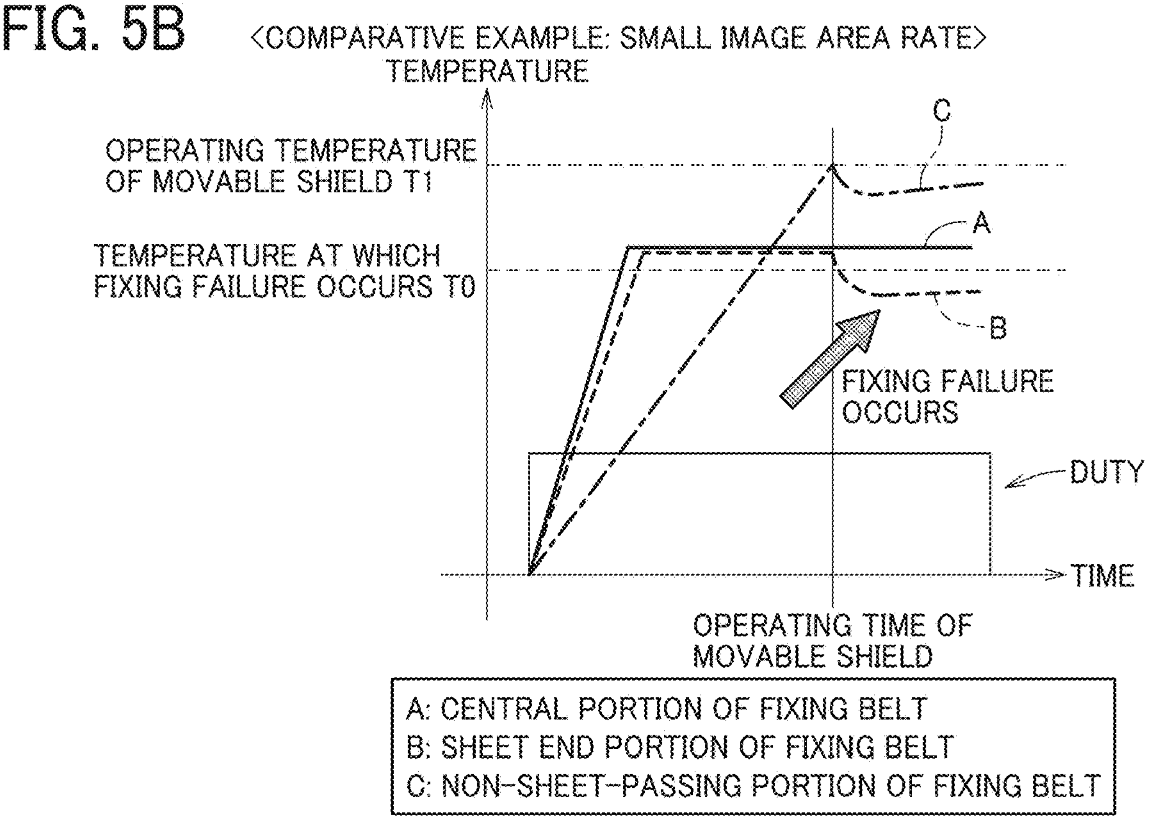
FIG. 5B is a graph illustrating temperatures of a fixing belt when the image forming apparatus prints images having small image area rates and when an operating temperature of the movable shield of FIG. 2 is low.

FIGS. 5A and 5B are graphs illustrating temperature changes of the fixing belt 51. FIG. 5A is a graph illustrating the temperature change of the fixing belt 51 in the fixing device according to the present embodiment. In the present embodiment, the operating temperature of the movable shield 59 is increased from T1 to T2 to prevent fixing failure that occurs when the image forming apparatus prints images having small image area rates. FIG. 5B is a graph illustrating the temperature change of the fixing belt in the fixing device according to a comparative example. In the comparative example, the operating temperature T1 of the movable shield is fixed to be the relatively low temperature, and the fixing failure occurs when the image forming apparatus prints the images having the small image area rates.

In FIGS. 5A, 5B, 7A, and 7B, the solid line A indicates the temperature A of the central portion of the fixing belt 51 in the width direction of the fixing belt 51, the dashed line B indicates the temperature B of a sheet end portion of the fixing belt 51, the sheet end portion facing an end of the sheet in the width direction, and the alternate long and short dash line C indicates the temperature C of the non-sheet-passing region of the fixing belt 51. As illustrated in FIG. 5A, increasing the operating temperature of the movable shield 59 from T1 to T2 increases the temperature C of the non-sheet-passing region of the fixing belt 51.

The increased temperature C of the non-sheet passing region affects the temperature B in the sheet end portion of the fixing belt 51 to prevent the temperature B form dropping. As a result, the above-described configuration can prevent the occurrence of the fixing failure in the end of the sheet (that is a low temperature fixing failure). Even if the operating temperature of the movable shield is raised to T2, the amount of temperature rise in the non-sheet-passing region of the fixing belt 51 is limited as indicated by the solid line C, and therefore, the belt breakage does not occur.

In contrast, maintaining the operating temperature of the movable shield to be the relatively low temperature T1 as illustrated in FIG. 5B in the comparative example decreases the temperature C in the non-sheet-passing region of the fixing belt 51. Due to this influence, the temperature B in the sheet end portion of the fixing belt 51 rapidly decreases after the operation of the shield, and as a result, the fixing failure (that is the low temperature fixing failure) occurs in the end of the sheet.

The operating temperature T2 of the movable shield may be changed according to an image forming condition. The image forming condition may be the image area rate of an unfixed toner image.

This is because the duty (the heat generation amount) of the halogen heater changes depending on the image area rate. The higher the image area rate, the higher the duty.

The image area rate is a proportion of an area where the image is actually formed to an entire area of a certain range. The image area rate can be determined by a proportion of the number of dots forming the image to the number of dots in the entire area of the certain range.

The image area rate may be A) An average image area rate of the image formed on the sheet as the recording medium, B) An average image area rate in the main scanning direction, C) An average image area rate of the image formed in the end of the sheet in the main scanning direction, and D) An average image area rate obtained by further averaging, in the sub-scanning direction for each sheet, the average image area rate of the image formed in the end of the sheet in the main scanning direction. The lower the image area rate is, the higher the operating temperature T2 of the movable shield can be set.

Alternatively, the lower the image area rate is, the smaller the amount of shielding by the movable shield 59 can be made. Such a configuration can prevent the occurrence of the fixing failure (the low-temperature fixing failure) in the end of the sheet.

The image forming condition may be the toner overlapping ratio. The toner overlapping ratio means the number of toner layers overlaid on the sheet to generate various colors. One toner layer is represented as a toner overlapping ratio of 100%, overlaying two toner layers is represented as a toner overlapping ratio of 200%, and overlaying three toner layers is represented as a toner overlapping ratio of 300%. For example, since the cyan color is generated by the cyan toner layer, the toner overlapping ratio is 100%. Since the red color is generated by the yellow toner layer and the magenta toner layer, the toner overlapping ratio is 200%.

The toner overlapping ratio changes the amount of toner on the sheet and changes the duty (the heat generation amount) of the halogen heater. The higher the toner overlapping ratio, the higher the duty. The lower the overlapping ratio and the duty are, the higher the operating temperature T2 of the movable shield can be set.

Alternatively, the lower the overlapping ratio and the duty are, the smaller the amount of shielding by the movable shield 59 can be set. Such a configuration can prevent the occurrence of the fixing failure (the low-temperature fixing failure) in the end of the sheet.

The image forming condition may be the size (the length) of a margin from the edge of the recording medium.

This is because the size of the margin changes the temperature drop in the sheet end portion of the fixing belt 51. The "edge of the recording medium" is the edge in a width direction orthogonal to the conveyance direction of the recording medium. The larger the length of the margin from the edge, the larger the amount of the temperature drop in the sheet end portion. The longer the margin from the edge is, the higher the operating temperature T2 of the movable shield can be made.

Alternatively, the longer the margin from the edge is, the smaller the amount of shielding by the movable shield 59 can be set. Such a configuration can prevent the occurrence of the fixing failure (the low-temperature fixing failure) in the end of the sheet. The image forming condition may be the number of the color toners forming the image.

This is because the toner overlapping ratio in a full color mode in which the multiple color toners are used to form the image is higher than the toner overlapping ration in a monochrome mode in which single color toner is used to form the image, and the duty (the heat generation amount) of the halogen heater in the full color mode is larger than the duty of the halogen heater in the monochrome mode. The smaller the number of colors of the toner, the higher the operating temperature T2 of the movable shield can be made.

Alternatively, the smaller the number of colors of the toner is, the smaller the amount of shielding by the movable shield 59 can be made. Such a configuration can prevent the occurrence of the fixing failure (the low-temperature fixing failure) in the end of the sheet.

The controller 337 as the circuitry in the fixing device or the image forming apparatus sets the above-described image forming conditions and the operating temperature T2 of the movable shield. The movable shield 59 operates based on a signal from the controller 337.

Heat transfer from the non-sheet-passing region to the sheet end portion is described below.

When the image area rate is small or when the toner overlapping ratio is small (for example, in the monochrome mode), the amount of heat generated by the heater is small. As a result, the gradient of the temperature rise in the non-sheet passing region when the image forming apparatus prints images having the small image area rates or the small toner overlapping ratios becomes gentle compared to the gradient of the temperature rise in the non-sheet passing region when the image forming apparatus prints images having the large image area rates.

The controller 337 moves the movable shield 59 to shield the fixing belt 51 from the heat radiated by the heater when the temperature detected by the temperature sensor is equal to or higher than a temperature threshold value. Based on the above description, the temperature threshold value when the image forming apparatus prints images having the small image area rates or the small toner overlapping ratios can be higher than the temperature threshold value when the image forming apparatus prints images having the large image area rates. Increasing the temperature threshold value as described above increases an amount of heat stored in the non-sheet-passing region of the fixing belt 51.

Moving the movable shield to shield the fixing belt 51 from the heat of the heater causes the temperature drop in the sheet end portion of the fixing belt 51 that is the end of the sheet-passing region of the fixing belt. However, the heat stored in the non-sheet-passing region is transferred to the end of the sheet-passing region, which reduces the amount of the temperature drop. As a result, even when the heater generates the small amount of heat, the occurrence of the fixing failure at the end of the sheet can be prevented.

Figure 6B:
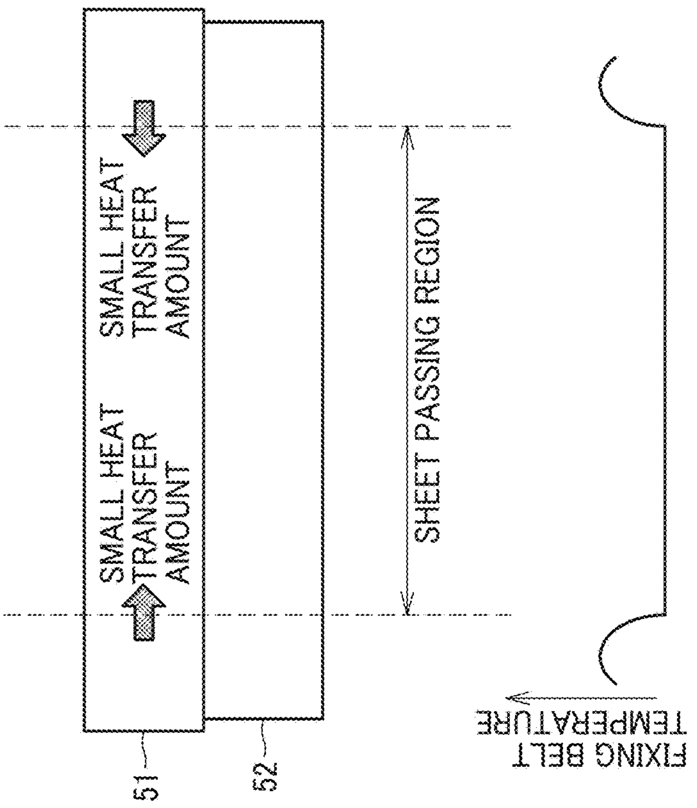
FIG. 6B is a diagram to illustrate heat transfer from a non-sheet-passing region of a fixing belt to a sheet-passing region of the fixing belt when an operating temperature of a movable shield is low.
Figure 6A:
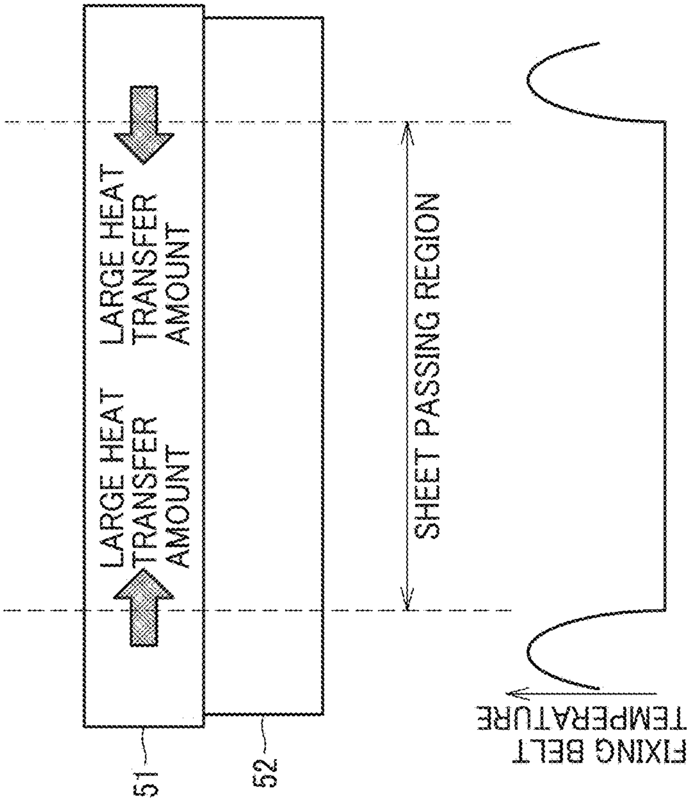
FIG. 6A is a diagram to illustrate heat transfer from a non-sheet-passing region of a fixing belt to a sheet-passing region of the fixing belt when an operating temperature of a movable shield is high.

FIGS. 6A and 6B are diagrams to illustrate heat transfer from the non-sheet-passing region in which the heat is stored to the end of sheet passing region. FIG. 6A corresponds to FIG. 5A. FIG. 6A illustrates that the non-sheet-passing region stores the heat, and the heat transfer from the non-sheet-passing region to the end of the sheet-passing region reduces the temperature drop at the end of the sheet-passing region.

On the other hand, FIG. 6B corresponds to FIG. 5B. Since the operating temperature T1 of the movable shield is low, the heat stored in the non-sheet-passing region is less than the heat stored in the non-sheet-passing region under the condition of FIG. 6A. Under the condition of FIG. 6B, the heat transfer from the non-sheet-passing region in which the heat is stored to the end of sheet passing region cannot sufficiently reduce the temperature drop. As a result, the fixing failure occurs as indicated by an arrow in FIG. 5B.

The operating temperature of the movable shield is described below.

For example, the operating temperature T2 of the movable shield can be set as illustrated in Table 1 below. As illustrated in Table 1, the present inventors performed experiments. In the experiments, image area rates, 100%, 50%, 5% were set, and the duty of the heater (that is the heat generation of the heater), the temperature detected by a non-sheet-passing region temperature sensor when the movable shield is moved so that the abnormal image does not occur in the end of the sheet, and the operating temperature of the movable shield that can reduce the excessive temperature rise in the non-sheet passing region were investigated. In the experiments, the application voltage was 100V, and the image forming apparatus printed images on sheets of plain paper having a basis weight of 75 g/$m^2$ and double letter size (DLT size).

TABLE 1

| IMAGE AREA RATE | AVERAGE DUTY OF HEATER | TEMPERATURE DETECTED BY NON-SHEET-PASSING REGION PRESSURE ROLLER SENSOR WHEN THE ABNORMAL IMAGE DID NOT OCCUR AT THE END OF SHEET | OPERATION TEMPERATURE OF MOVABLE SHIELD TO REDUCE EXCESSIVE TEMPERATURE RISE IN NON-SHEET-PASSING REGION |
|---|---|---|---|
| 100% | 70% | >120° C. | <120° C. |
| 50% | 60% | >150° C. | <155° C. |
| 5% | 50% | >180° C. | <190° C. |

Table 1 illustrates that the image area rate changes the average duty of the heater that is the amount of heat generation of the heater, and the change of the amount of heat generation changes the operating temperature of the movable shield that is the temperature threshold value to move the movable shield. As is apparent from Table 1, decreasing the image area rate from 100% to 50% to 5% decreases the amount of heat generation of the heater (that is the average duty) from 70% to 60% to 50%.

The above-described decrease in the amount of heat generation results in an increase of the operating temperature of the movable shield (that is the temperature threshold value) from 120° C. to 155° C. to 190° C. in order to prevent the occurrence of the fixing failure (that is the low temperature fixing failure) in the end of the sheet. As described above, it is understood that the image changes the operating temperature of the movable shield to reduce the excessive temperature rise in the non-sheet-passing region and a temperature at which an offset (that is the abnormal image in the end of the sheet) occurs.

The image having a small toner overlapping ratio (for example, a single color image or a monochrome image) decreases the amount of heat generation of the heater. This is because a small amount of toner reduces an amount of heat to fix the toner onto the sheet, which results in decrease in the amount of heat generation of the heater to maintain the temperature of the fixing belt. Similar to the image forming condition with the small image area rate, the image forming condition with the small toner overlapping ratio requires increasing the operating temperature of the movable shield (that is the temperature threshold value).

The image area rate or the toner overlapping ratio may be average values calculated from the image on the entire sheet or average values calculated from an image on a temperature control area limited by the position of the temperature sensor. Calculating the average value from the image on the temperature control area enables accurately controlling the temperature of the pressure roller in the non-sheet-passing region and the operating temperature of the movable shield.

The temperature control area is a part of the entire fixing belt. An amount of heat consumed in the temperature control area determines the amount of heat generation of the heater. In consideration of the variation in conveyance of the sheet and the variation in assembly of the fixing module, the temperature control area is preferably defined by the temperature sensor position±20 mm. Specifically, the controller calculates the average of the image area rate or the toner overlapping ratio in an area on the sheet including the position facing a range of the temperature sensor position±20 mm.

The following describes results of experiments in which the shielding amounts of the movable shield are changed instead of the operating temperature of the movable shield. As illustrated in Table 2, the present inventors performed the experiments. In the experiments, the present inventors set image area rates, 100%, 50%, 5% and investigated the duty of the heater (that is the heat generation of the heater) and the shielding amounts of the movable shield in which the abnormal image did not occur in the end of the sheet.

TABLE 2

| IMAGE AREA RATE | AVERAGE DUTY OF HEATER | SHIELDING AMOUNT IN WHICH EXCESSIVE TEMPERATURE RISE WAS REDUCED, AND ABNORMAL IMAGE DID NOT OCCUR IN THE END OF SHEET |
|---|---|---|
| 100% | 70% | 95 to 100% |
| 50% | 60% | 60 to 70% |
| 5% | 50% | 20 to 30% |

Table 2 illustrates that changing the shielding amount corresponding to the image forming condition instead of changing the operating temperature can prevent the occurrence of the abnormal image in the end of the sheet and excessive temperature rise in the non-sheet-passing region of the fixing belt.

Temperature change in the fixing belt of the fixing device according to the comparative example is described below.

Figure 7A:
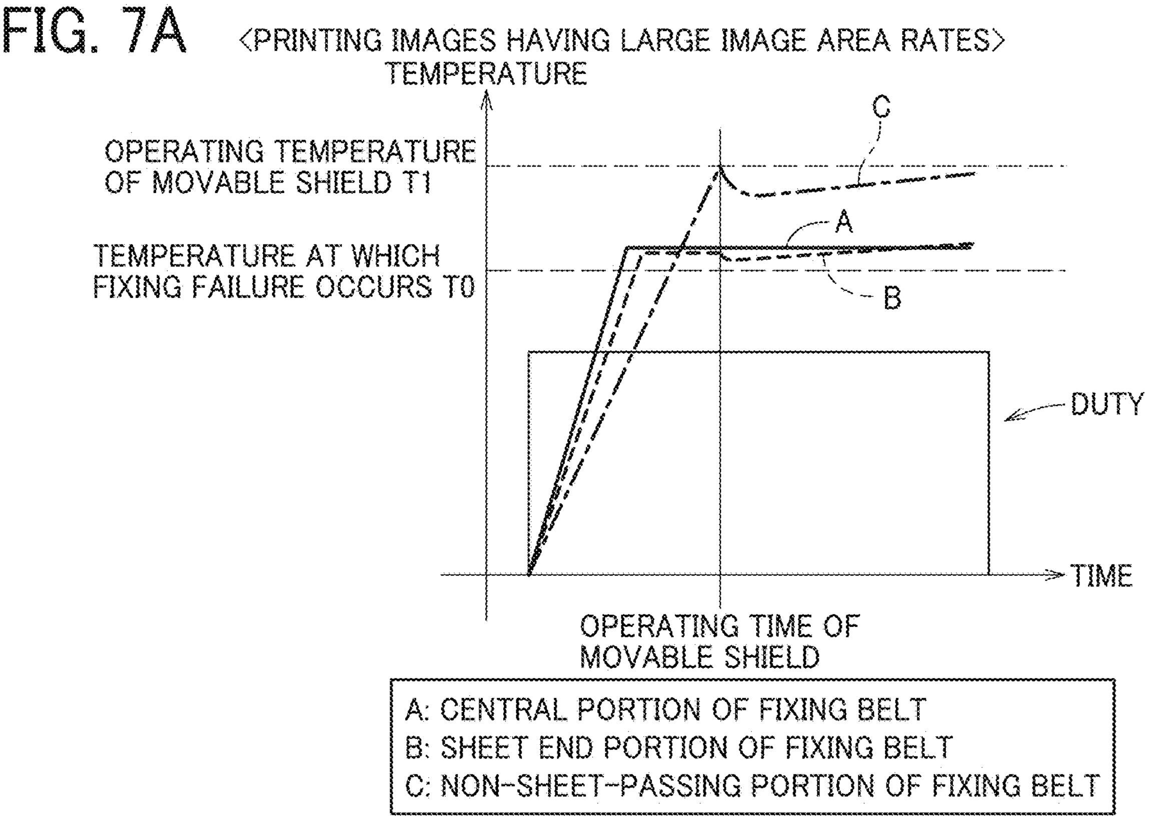
FIG. 7A is a graph illustrating temperatures of a fixing belt when the image forming apparatus prints images having large image area rates and when an operating temperature of the movable shield of FIG. 2 is a constant value.
Figure 7B:
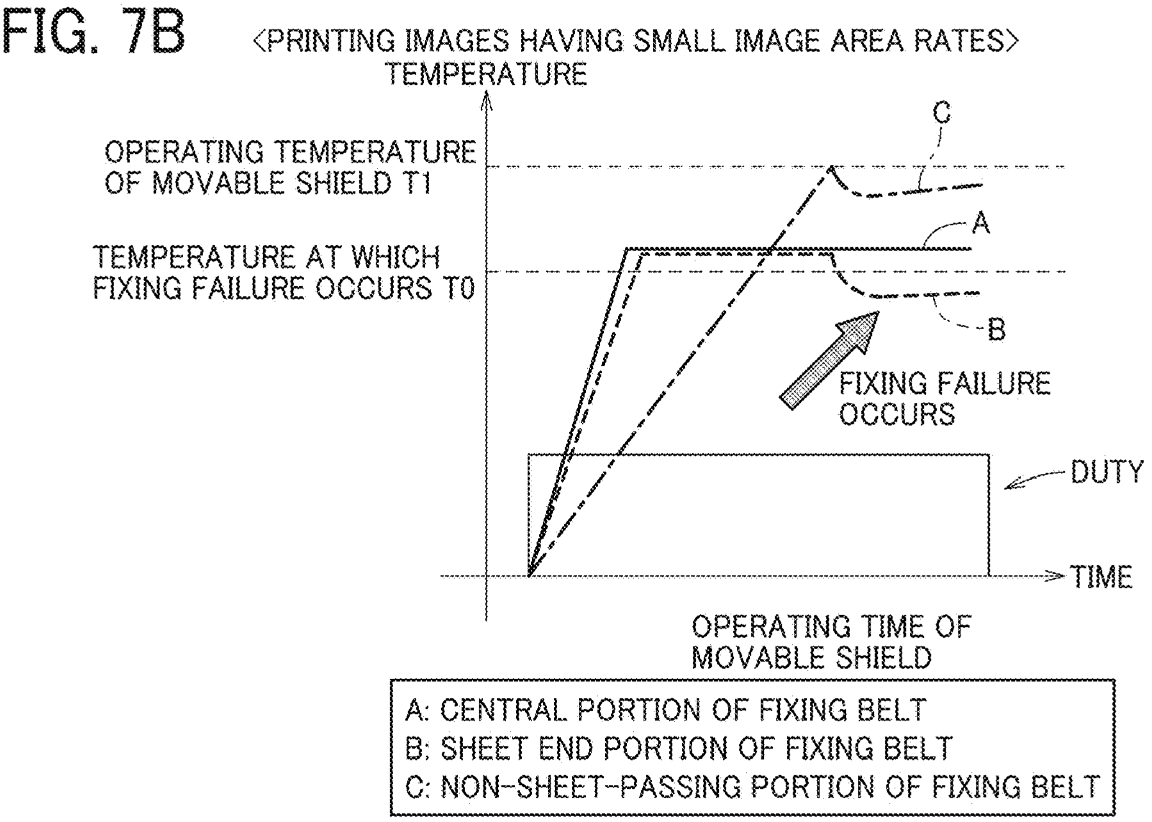
FIG. 7B is a graph illustrating temperatures of a fixing belt when the image forming apparatus prints images having small image area rates and when an operating temperature of the movable shield of FIG. 2 is the constant value of FIG. 7A.

FIGS. 7A and 7B are graphs illustrating temperature changes of the fixing belt 51 according to the comparative example in which the operating temperature of the movable shield is constant. FIG. 7A is a graph illustrating a temperature change of the fixing belt 51 when the image forming apparatus prints images having large image area rates. FIG. 7B is a graph illustrating a temperature change of the fixing belt 51 when the image forming apparatus prints images having small image area rates.

In FIG. 7A, the heater generates a large amount of heat (in other words, a high duty) in response to printing images having the large image area rates. As a result, the temperature C in the non-sheet-passing region of the fixing belt 51 rapidly rises. The amount of heat (in other words, the temperature) stored in the non-sheet-passing region during the operation of the shield is also increased. For this reason, the amount of the temperature drop in the end of the sheet passing region is reduced, which prevents the occurrence of the fixing failure at the end of the sheet facing the end of the sheet passing region B.

In order to reduce the excessive temperature rise in the non-sheet-passing region, the movable shield 59 moves to a position at which the movable shield 59 is interposed between the halogen heater 55 and the fixing belt 51 in response to the temperature in the end of the fixing belt 51 becoming equal to or higher than a certain temperature threshold value. As a result, the movable shield 59 shields the radiant heat radiated from the halogen heater 55 to the fixing belt 51.

The temperature threshold value at which the movable shield 59 starts moving is determined under a condition that the amount of heat generation of the halogen heater 55 is large, and a temperature gradient in the non-sheet-passing region is the maximum (for example, an image having a high image area rate, such as a solid image). After the movable shield 59 shields the heat radiated from the halogen heater 55, the temperature of the fixing belt in the end of the sheet-passing region drops.

However, under the image forming condition with the large image area rate, the large amount of heat generation of the heater reduces the temperature drop. As a result, the abnormal image does not occur at the end of the sheet passing region.

In contrast, under the image forming condition with the small image area rate, the amount of heat generation of the heater is small (in other word, the duty is low). As a result, the temperature in the non-sheet-passing region of the fixing belt 51 indicated by the solid line C gently rises as illustrated in FIG. 7B. In addition, the amount of heat stored in the non-sheet passing region (in other words, the temperature) during the operation of the movable shield is also small. For this reason, the amount of the temperature drop in the end of the sheet passing region is large, which causes the occurrence of the fixing failure at the end of the sheet facing the end of the sheet passing region as indicated by the dashed line B in FIG. 7B.

The present disclosure has been described above on the basis of the embodiments, but the present disclosure is not limited to the embodiments. Needless to say, various alterations can be made in the scope of the technical idea described in the scope of the claims. For example, a heat source to heat the fixing belt 51 as a rotator is the halogen heater 55 in the above-described embodiment but may be an induction coil that generates magnetic flux may be used instead of the halogen heater 55.

Heating by the induction coil is called an electromagnetic induction heating (IH) method. The fixing device using the electromagnetic induction heating (IH) method has advantages of rapid heating and high heating efficiency, as compared with a heating method using a halogen lamp.

In the fixing device using the electromagnetic induction heating (IH) method, changing a rotation angle of the center core made of ferrite or the position of the movable shield adjusts the shielding amount of the magnetic flux in order to make the magnetic flux generated by the induction coil correspond to the sheet size. As a result, the shielding amount of the movable shield can be changed in accordance with the image forming condition. The image area rate, the toner overlapping ratio, the size (length) of the margin from the edge of the recording medium, and the number of toner colors are described as an example of as the image forming condition, but at least one of the operating temperature and the shielding amount of the movable shield may be changed in accordance with one or a combination of these conditions.

The following describes preferred aspects of the present disclosure.

First Aspect

In a first aspect, an image forming apparatus includes an image forming section, a fixing device, and circuitry. The image forming section forms an image on a recording medium. The fixing device includes a rotator, a pressure rotator, a heater, and a movable shield. The rotator includes a flexible endless belt. The pressure rotator is pressed against the rotator to form a nip between the rotator and the pressure rotator. The heater heats the rotator. The movable shield is disposed between the heater and the rotator to shield the rotator from radiant heat generated from the heater is movable according to a size of the recording medium. The circuitry is configured to control the image forming section to form the image on the recording medium based on an image forming condition and change at least one of an operating temperature of the movable shield or a shielding amount of the movable shield based on the image forming condition.

Second Aspect

In a second aspect, the circuitry in the image forming apparatus according to the first aspect is further configured to change at least one of the operating temperature of the movable shield or the shielding amount of the movable shield based on an image area rate that is a proportion of an area where the image is actually formed to an entire area of a certain range, as the image forming condition.

Third Aspect

In a third aspect, the circuitry in the image forming apparatus according to the first aspect or the second aspect is further configured to change at least one of the operating temperature of the movable shield or the shielding amount of the movable shield based on a toner overlapping ratio as the image forming condition.

Fourth Aspect

In a fourth aspect, the circuitry in the image forming apparatus according to any one of the first to third aspects is further configured to change at least one of the operating temperature of the movable shield or the shielding amount of the movable shield based on a size of a margin from an edge of the recording medium in a width direction of the recording medium, as the image forming condition.

Fifth Aspect

In a fifth aspect, the image forming section in the image forming apparatus according to any one of the first to fourth aspects forms the image using multiple color toners, and the circuitry is further configured to change at least one of the operating temperature of the movable shield or the shielding amount of the movable shield based on a number of color toners used to form the image as the image forming condition.

Sixth Aspect

In a sixth aspect, the heater in the image forming apparatus according to any one of the first to fifth aspects includes a halogen heater or an induction coil.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality.

The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus, comprising:

an image forming section to form an image on a recording medium;

a fixing device including:

a rotator including a flexible endless belt;

a pressure rotator pressed against the rotator to form a nip between the rotator and the pressure rotator;

a heater to heat the rotator; and a movable shield disposed between the heater and the rotator to shield the rotator from radiant heat generated from the heater, the movable shield being movable according to a size of the recording medium; and circuitry configured to:

obtain an image forming condition comprising image data corresponding to the image;

control, based on the image forming condition, the image forming section to form the image on the recording medium; and change, based on the image forming condition, an operating temperature of the movable shield or a shielding amount of the movable shield.

2. The image forming apparatus according to claim 1, wherein the image data of the image forming condition includes an image area rate that is a proportion of an area where the image is actually formed to an entire area of a certain range, and the circuitry is further configured to change, based on the image forming condition, the operating temperature of the movable shield or the shielding amount of the movable shield.

3. The image forming apparatus according to claim 2, wherein the image area rate is an average image area rate of an image formed in an end portion of the recording medium in a main scanning direction.

4. The image forming apparatus according to claim 1, wherein the image data of the image forming condition includes a toner overlapping ratio, and the circuitry is further configured to change, based on the image forming condition, the operating temperature of the movable shield or the shielding amount of the movable shield.

5. The image forming apparatus according to claim 1, wherein the image data of the image forming condition includes a size of a margin, the margin being from an edge of the recording medium in a width direction of the recording medium, and the circuitry is further configured to change, based on the image forming condition, the operating temperature of the movable shield or the shielding amount of the movable shield.

6. The image forming apparatus according to claim 1, wherein the image forming section forms the image using multiple color toners, the image data of the image forming condition includes a number of color toners used to form the image, and the circuitry is further configured to change, based on the image forming condition, the operating temperature of the movable shield or the shielding amount of the movable shield.

7. The image forming apparatus according to claim 1, wherein the heater includes a halogen heater or an induction coil.

8. The image forming apparatus according to claim 1, wherein the circuitry is further configured to determine the operating temperature of the movable shield by referencing a stored table which defines a relationship between the image forming condition and the operating temperature.

9. The image forming apparatus according to claim 1, wherein the circuitry is further configured to determine the shielding amount of the movable shield by referencing a stored table which defines a relationship between the image forming condition and the shielding amount.

10. The image forming apparatus according to claim 1, wherein the movable shield is supported by an arcuate slider that is slidably attached to a flange holding an end of the flexible endless belt.

11. The image forming apparatus according to claim 10, wherein the movable shield is driven by a motor via a gear train engaged with the arcuate slider.

12. The image forming apparatus according to claim 1, further comprising a photo-interrupter configured to detect a position of the movable shield.

13. The image forming apparatus according to claim 1, wherein the flexible endless belt comprises a base layer, an elastic layer on the base layer, and a release layer on the elastic layer.

14. The image forming apparatus according to claim 13, wherein the elastic layer has a thickness 80 micrometers or more.

15. The image forming apparatus according to claim 1, wherein the heater includes a central heater and an end heater having different heat generation densities.

16. The image forming apparatus according to claim 1, wherein the movable shield has an arcuate cross-section and is rotatable around the heater.

* * * * *